US005502834A

United States Patent [19]

Arata et al.

[11] Patent Number: 5,502,834

[45] Date of Patent: Mar. 26, 1996

[54] MEMORY INTERFACE APPARATUS FOR CARRYING OUT COMPLEX OPERATION PROCESSING

[75] Inventors: Katsumi Arata, Tenri; Shinichi Yoshida, Kashihara; Tsuyoshi Muramatsu, Tenri, all of Japan

[73] Assignee: Sharp Kabushiki Kaisha, Osaka, Japan

[21] Appl. No.: 215,564

[22] Filed: Mar. 22, 1994

[30] Foreign Application Priority Data

Mar. 22, 1993 [JP] Japan .................................... 5-061675

[51] Int. Cl.[6] ........................................ G06F 13/12

[52] U.S. Cl. ................................ 395/496; 395/490

[58] Field of Search ................................ 395/496

[56] References Cited

FOREIGN PATENT DOCUMENTS 5-274213 10/1993 Japan .

OTHER PUBLICATIONS

Kanekura, Hiroshi and Miyata, Souichi. An Evaluation of Parallel–Processing in the Dyanamic Data–Driven Processors.

*Primary Examiner*—Reba I. Elmore

[57] ABSTRACT

A memory interface apparatus includes: a pipeline register holding a data packet from a transmission path to provide an instruction code, a generation number, and data separately; a memory access unit accessing an image memory according to the instruction code, a circuit latching the output of the image memory; an ALU carrying out an operation specified by the instruction code from the pipeline register between data from the pipeline register and the output of the latch circuit for output of the operation result; a selector responsive to a select signal for selecting one of data from the pipeline register and the output of the ALU to apply the selected result to the image memory as data; an output unit generating a data packet including a result of a series of complex operation carried out by the pipeline register, the image memory, and the ALU for output; a transmission control unit controlling transmission of a data packet on the transmission path carried out by the pipeline register and the output unit; and a control unit responsive to the instruction code from the pipeline register for controlling the ALU, the memory access unit, the image memory, the latch circuit, the selector, the output unit, and the transmission control unit so that a series of complex operation processing including an access to the image memory specified by the instruction code is carried out.

9 Claims, 9 Drawing Sheets

MEMORY INTERFACE APPARATUS FOR CARRYING OUT COMPLEX OPERATION PROCESSING

BACKGROUND OF THE INVENTION

1. Field of the Invention

The present invention generally relates to memory interface apparatuses responsive to a data packet applied from a data driven processor for accessing an image memory or the like for output of the result, and more particularly, to an apparatus responsive to a data packet having a generation number attached thereto in accordance with the input-time order provided from a dynamic data driven processor for accessing an image memory using the generation number as an address for output of the result.

2. Description of the Related Art

In recent years, in the field of image processing, for example, increase in the operation speed of a processor has been in great demand. Parallel processing is a prominent solution for speedup of a processor. Among parallel processing architectures, attention is particularly paid to an architecture called data driven type architecture.

A data driven processor proceeds processing according to a simple rule "when all the data needed for an action are available, and resources such as an operation unit required for the action are assigned thereto, the action is carried out." As a technique required for implementation of the architecture, there is a mechanism for detecting availability (firing) of input data. An architecture which accepts only one set of input data for an action in the firing detection is called static data driven system architecture, and an architecture which accepts two or more sets of input data is called dynamic data driven system architecture.

The static data driven system is not sufficiently suitable for a processing of time series data, such as a video signal processing. It is considered that the dynamic data driven system must be employed. In this case, since a plurality of input sets exist for an action, it is necessary to introduce a concept of a generation identifier or the like for identifying the plurality of input sets. In this specification, the generation identifier is hereinafter referred to as a "generation number".

One example of such a video processing data driven information processor as described above is described in "An Evaluation of Parallel-Processing in the Dynamic Data Driven-Processor" (Information Processing Society of Japan, Microcomputer Architecture Symposium, Nov. 12, 1991). FIG. 1 is a block diagram of a video processing data driven information processor using a conventional memory interface apparatus. Referring to FIG. 1, the data driven information processor includes a video processing data driven processor 1, an image memory 3, and a conventional memory interface 24.

A time series of a data packet having a generation number attached thereto in accordance with the input-time order is applied to data driven processor 1 via data transmission paths 7, 8. Data driven processor 1 applies an access request for image memory 3 (read/update of the contents of image memory 3, or the like) to memory interface 24 via a data transmission path 4 according to a preset data flow program. In response to the access request, memory interface 24 accesses an address of image memory 3 corresponding to an address (generation number) included in a data packet via a memory access control line 6, and sends back the result to data driven processor 1 via a data transmission path 5. In response to the output of memory interface 24, data driven processor 1 processes the data packet, and outputs a data packet via a data transmission path 9 or 10.

FIG. 2 shows one example of a field configuration of a data packet applied to memory interface 24 via data transmission path 4. Referring to FIG. 2, the data packet includes an instruction code 26, a generation number 28, first data 30, and second data 32.

Instruction code 26 shows the content of a processing to which an image memory is subjected. The content of the processing includes, for example, read or update of the content of image memory 3.

Generation number 28 is an identifier attached, in accordance with the input order, to a data packet applied to data driven processor 1 via data transmission path 7 or 8. Data driven processor 1 uses the generation number for matching of data. On the other hand, for memory interface 24, the generation number is an address for accessing image memory 3. More specifically, memory interface 24 accesses an address of image memory 3 specified by the generation number.

First data 30 and second data 32 are data interpreted differently in accordance with the content of instruction code 26. If instruction code 26 is an update instruction for image memory 3, for example, first data 30 is write data for image memory 3, and second data 32 does not have meaning. If instruction code 26 is a read instruction for image memory 3, neither first data 30 nor second data 32 has meaning.

In the data packet shown in FIG. 2, instruction code 26, generation number 28, first data 30, and second data 32 are 8 bits, 24 bits, 12 bits, and 12 bits in length, respectively.

Referring to FIG. 3, a field configuration of an output data packet output from memory interface 24 via data transmission path 5 is as follows. The output data packet includes an instruction code 34, a generation number 36, and data 38.

Referring to FIG. 3, 8-bit instruction code 34 and 24-bit generation number 36 are instruction code 26 and generation number 28 of a data packet applied to memory interface 24 shown in FIG. 2. Data 38 is a result of accessing of image memory 3. Data 38 is 12 bits in length.

FIG. 4 shows a detailed configuration of generation number 28. Referring to FIG. 4, generation number 28 includes a 3-bit field address FD#, an 11-bit line address LN#, and a 10-bit pixel address PX#.

Generation number 28 shown in FIG. 4 corresponds to a logical configuration of image memory 3 as shown in FIG. 5. The logical configuration of image memory 3 shown in FIG. 5 includes eight field image memories 40*a* to 40*h* specified by 3-bit field address FD#. Each field image memory includes $2^{11}$=2048 lines in the vertical direction corresponding to 11-bit line address LN# shown in FIG. 4. Each line includes $2^{10}$=1024 pixels corresponding to 10-bit pixel address PX# shown in FIG. 4.

A data packet already has a generation number attached thereto in accordance with the input time order when being applied to video processing data driven processor 1 (refer to FIG. 1). When image memory 3 is accessed at an address determined on the generation number, an access point starts at top left of the first image memory 40*a*, and moves to scan image memory 40*a* in the horizontal direction. When scanning of one line is completed, the access point moves leftmost on a line directly under the scanned line. When the access point reaches bottom right of the first image memory 40*a*, and scanning is completed, the access point moves top left of the second image memory 40*b*. The access point moves to scan image memories 40*b* to 40*h* in order. When the access point reaches bottom right of the last image memory, the eighth image memory 40*h* in this example, and scanning is completed, the access point returns to top left of the first image memory 40*a*, and this procedure is repeated.

The memory interface apparatus moves an address for accessing the image memory in accordance with the input order of signal data packets applied to the data driven processor. Therefore, the memory interface apparatus can process the content of image memory 3 following video scanning. This is why such a memory interface apparatus is suitable for the video processing.

Since the memory interface apparatus is thus configured, however, the conventional memory interface apparatus cannot specify an arbitrary address and read out the content of the image memory. This is because the conventional memory interface apparatus accesses the image memory at an address depending on the generation number of a data packet. Because of such a problem, the conventional memory interface apparatus was not able to carry out a table look-up process, for example, writing a table in advance in a portion of the image memory, and reading out the content of the table corresponding to a data value of the data packet.

In a video signal processing, as in the case of a masking processing of a 3×3 neighborhood region, for example, such a processing is often carried out as reading out the content of adjacent regions, carrying out some operation, and writing the result in a same field or in different fields. In the conventional memory interface apparatus, an address for accessing the image memory was determined only depending on a generation number of a data packet. Therefore, it was not easy to carry out such a processing as reading out the content of adjacent regions for some processing. This is a problem also in the case where a processing such as the above-described masking processing is carried out to neighborhood of an arbitrary pixel.

It would be convenient to obtain a memory interface apparatus which can access a memory in a manner suitable for the video signal processing and a processing similar to the video signal processing, and which can specify an arbitrary address to write/read out the content.

It would be more convenient to easily access a memory at neighborhood of an address specified by a generation number, and a memory at neighborhood of an address formed from a generation number plus an arbitrary offset.

In order to accomplish the object, modification of an address according to the content of second data field 32 of an input signal packet is considered as a technique related to the present application. In this case, offset modifier data configured as shown in FIG. 6 is to be input as second data 32. Referring to FIG. 6, in this example, second data 32 is 12 bits in total in length composed of uppermost three bits, intermediate five bits, and lowermost four bits. The uppermost three bits denote a field offset. The intermediate five bits denote a line offset. The lowermost four bits denote a pixel offset. Allocation of the number of bits can be arbitrarily set in the range of the number of bits assigned to second data 32. In this example, the number of bits can be arbitrarily set in the range of 12 bits.

Signed integers (Δfd, Δln, Δpx) of bit width assigned to respective offset values are stored in respective offset regions.

In a memory interface thus improved, an effective address in accessing image memory 3 is determined as follows. First, to a field address (fd#), a line address (ln#), and a pixel address (px#) included in generation number 28 (refer to FIG. 4) in a data packet, respectively added are a field offset (Δfd), a line offset (Δln) and a pixel offset (Δpx) shown in FIG. 6. Resultant values serve as an effective field address, and an effective line address, and an effective pixel address, respectively. This is shown in FIG. 7.

The effective address thus determined indicates an address at neighborhood of an address shifted from the address represented by generation number 28 of the data packet by the field offset, the line offset, and the pixel offset represented by second data 32. Thus shifted address is applied to a memory access circuit as a generation number. Therefore, in this case, the memory access circuit calculates a value of the field address, the line address, and the pixel address of generation number 28 originally applied to memory interface 24, plus a corresponding offset amount given as second data 32. The memory access circuit accesses image memory 3 at the calculated address.

FIG. 8 shows one example of an offset modified address. In the example shown in FIG. 8, field offset Δfd, line offset Δln, and pixel offset Δpx are set to 0, − 1, and −3, respectively. According to the offset modified address, accessed is an address in the same field as the address represented by generation number 28, and in one line before and three pixels before of the address represented by generation number 28. As described above, since an address (X) represented by the generation number can be offset modified by each offset of second data 32, neighborhood (●) of a predetermined address can be easily accessed. In a similar manner, a neighborhood write instruction can also be carried out.

In the above-described example, it is possible to carry out a processing of neighborhood around a generation number. However, the neighborhood processing is not always carried out at neighborhood around a position indicated by a generation number. Therefore, it would be more convenient in the image processing to process neighborhood not only around an address indicated by an applied generation number, but also around an address shifted from a generation number by an arbitrary offset.

A base offset may be provided for address modification, thereby making it possible to carry out address modification in a larger range. In order to implement this, three base offset registers may be provided in the memory interface. The three base offset registers are a base field offset register, a base line offset register, and a base pixel offset register. Offset values stored in these registers are denoted as Rfd, Ran, Rpx, respectively. Values are placed in these registers by a specific instruction called base offset register setting instruction via a data packet.

Referring to FIG. 9, in a memory interface using such a base offset, an effective address is determined as follows. First, an address indicated by a generation number is position-shifted by the base offset (Rfd, Rln, Rpx), and the shifted address is determined. Then, around the shifted address, offset modification is carried out by an offset modifier stored in a data field (for example, second data 32) as described above. As a result, it is possible to access inside of a rectangle indicated by dotted lines in FIG. 9. A system thus specifying a new address is hereinafter referred to as "wide area offset modification."

In this case, as shown in FIG. 10, a wide area field offset is obtained by adding a base field offset value to a field offset value. Similarly, a wide area line offset value is addition of a base line offset value and a line offset value, and a wide area pixel offset value is addition of a base pixel offset value and a pixel offset value. As shown in FIG. 9, after positionshifting by the base offset from the address indicated by a generation number, it is possible to process a neighborhood region around the base offset address.

If the bit width of each base offset register is sufficiently large, it is possible to carry out address modification to the entire region of the image memory, according to combination of base offset register values and settings of offset modifiers in data packets. As a result, it is considered that the video signal processing can be carried out efficiently.

In the above-described memory interface, an address for accessing the image memory in accordance with the input order of signal data packets is moved in the scan line direction. As a result, the memory interface has a configuration suitable for the video processing. In the memory interface, however, only one kind of processing, such as update or read of data, is carried out by one access to the image memory. Therefore, when it is necessary to carry out a predetermined operation between the storage contents of an image memory and a data value of a data packet, for example, a plurality of processings must be carried out separately.

Consider an FIR (Finite Impulse Response) filter often used in a digital signal processing, for example. FIG. 11 is a signal flow graph of one example of the FIR filter. When the processing represented by the signal flow graph is carried out using an image memory, a memory interface and a dynamic data driven processor, it is often required to add a data value of a data packet and the content of neighborhood around an address specified by a generation number of the data packet of the image memory.

The above-described processing of the memory interface is represented by a data flow graph shown in FIG. 12. In FIG. 12, "VR" denotes an instruction to update the image memory with input data. "VS" denotes an instruction to read the image memory. A set of three numbers at a right shoulder of each instruction is an offset value for specifying a memory access position. An instruction whose offset value is "−1, 2, −3", for example, accesses a position one field before, two lines below and three pixels left of the address indicated by a generation number of a data packet.

In the processing shown in FIG. 12, the content of each address must be read to be added to data. Therefore, a relatively large number of processings are required. Since the number of data packets in the video processing data driven processor increases accordingly, the input rate of data packets decreases.

SUMMARY OF THE INVENTION

One object of the present invention is, therefore, to provide a memory interface apparatus which can carry out a complex processing between a data packet and a predetermined memory such as an image memory without decreasing an input rate of data packets.

Another object of the present invention is to provide a memory interface apparatus which can carry out a complex processing between a data packet and a predetermined memory in response to one input data packet.

A still another object of the present invention is to provide a memory interface apparatus which can access, in response to one data packet, a predetermined memory at an address specified by the generation number, carry out a predetermined operation between the output of the predetermined memory and data of the data packet, and update the predetermined memory with the result.

A further object of the present invention is to provide a memory interface apparatus which can access, in response to one data packet, a predetermined memory at an address specified by the generation number, output the output of the predetermined memory as a data packet, and carry out a predetermined operation between the output of the predetermined memory and data of the data packet to update the predetermined memory with the result.

A further object of the present invention is to provide a memory interface apparatus which can access, in response to one data packet, a predetermined memory at an address specified by the generation number, carry out a predetermined operation between the output of the predetermined memory and data of a data packet, and output the resultant data packet.

The memory interface apparatus according to the present invention is provided in a transmission path of a data packet including an instruction code, a generation number, and data. The memory interface apparatus accesses a predetermined memory in response to input of a data packet. The memory interface apparatus includes: a first data holding unit holding the data packet applied from the transmission path to output the instruction code, the generation number modified by the data, and the data separately; a memory access unit accessing the predetermined memory according to the instruction code; a unit receiving the output of the predetermined memory; an operating unit having two inputs connected to receive data from the first data holding unit and the output of the receiving unit, respectively, for carrying out with respect to a value at the two inputs an operation specified by the instruction code from the first data holding unit to output the result; an input selecting unit responsive to a select signal for selecting one of data from the first data holding unit and the output of the operating unit to apply the selected result to the predetermined memory as data; an output unit producing a data packet including results of a series of complex operations carried out by the first data holding unit, the predetermined memory, and the operating unit for output; a transmission control unit controlling transmission of the data packet on the transmission path carried out by the first data holding unit and the output unit; and a control unit responsive to the instruction code from the first data holding unit for controlling the operating unit, the memory access unit, the predetermined memory, the receiving unit, the input selecting unit, the output unit, and the transmission control unit so that a series of complex operations is executed including access to the predetermined memory specified by the instruction code.

By making the operating unit, the memory access unit, the predetermined memory, the receiving unit, the input selecting unit, the output unit, and the transmission control unit cooperate with each other by using the control unit, the predetermined memory can be accessed at an address specified by the generation number of the data packet for output of the result. The operation can be carried out by the operating unit between the output and the data of the data packet.

The output unit preferably includes: an output selecting unit having a plurality of inputs respectively connected to the output of the input selecting unit and the output of the receiving unit and responsive to the output select signal from the control unit for selecting data in one of the plurality of inputs for output; and a second data holding unit having an input connected to the output of the output selecting unit for temporarily holding a value at the input to generate a data packet and to output the data packet on the transmission path in response to the transmission control signal from the transmission control device.

By making the operating unit, the memory access unit, the predetermined memory, the receiving unit, the input selecting unit, the output unit, and the transmission control unit cooperate with each other by using the control unit, the predetermined memory can be accessed at an address specified by the generation number of the data packet for output of the result. The operation can be carried out by the operating unit between the output and the data of the data packet. In addition, by using the output selecting unit and the second data holding unit, it is also possible to output the operation result from the output unit, and to update the predetermined memory with the result.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 13:
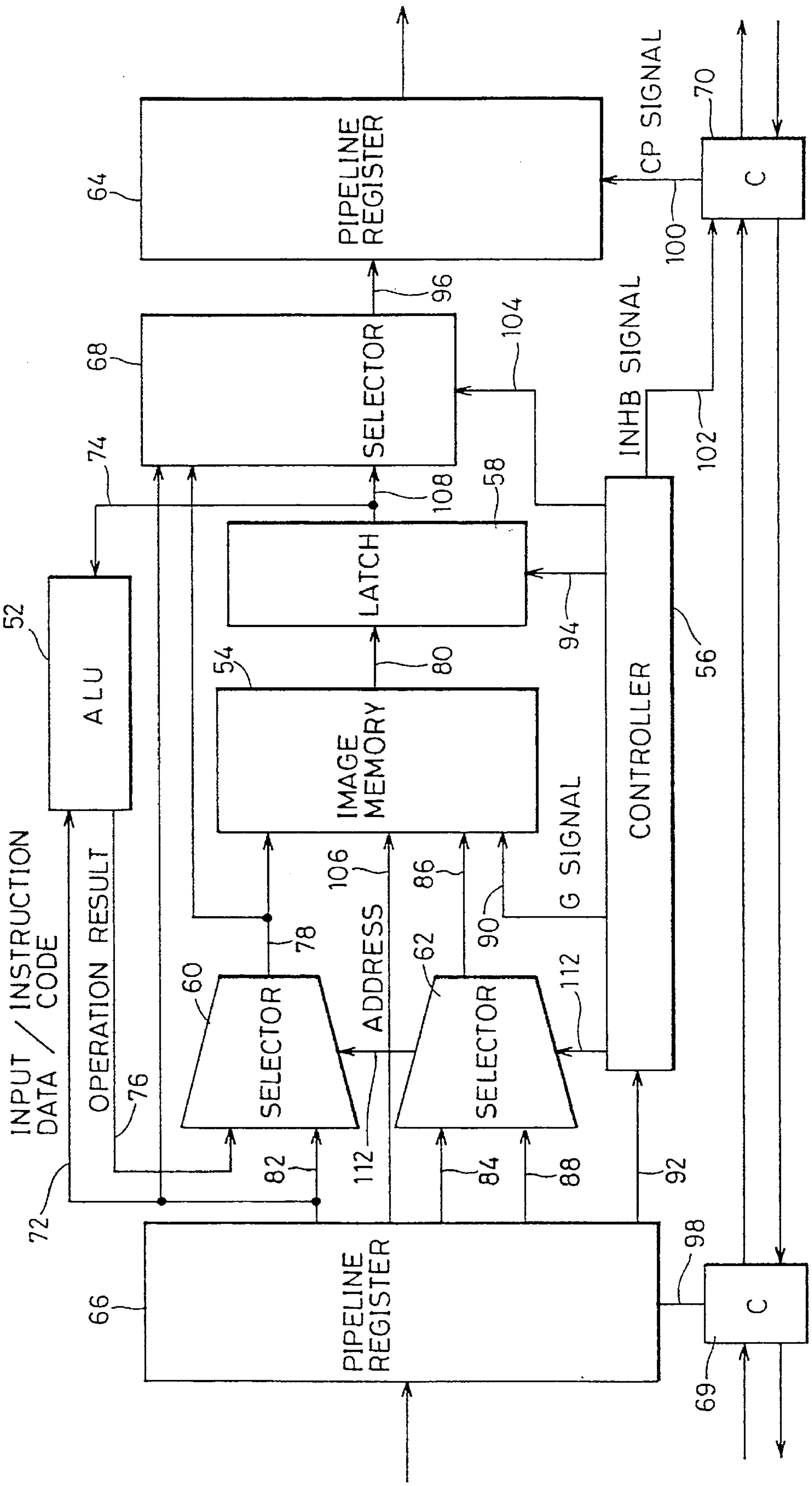
FIG. 13 is a block diagram of a memory interface apparatus with a complex operation processing function according to one embodiment of the present invention.

FIG. 13 is a block diagram showing a configuration of a memory interface apparatus according to one embodiment of the present invention. In FIG. 13, an image memory 54 is positioned at the center for simplification of illustration. However, the memory interface apparatus corresponds to a portion of the apparatus of FIG. 13 excluding image memory 54.

Referring to FIG. 13, the memory interface apparatus according to the embodiment includes a pipeline register 66 having its input connected to a data transmission path (pipeline). Pipeline register 66 latches the content of a data packet applied to the memory interface. Pipeline register 66 outputs input data 82 included in the latched data packet, an address 106, a signal 88 indicating read or update of the image memory, a signal 92 indicating the content of an instruction code in the data packet, and a signal 84 indicating update. It should be noted that address 106 in this case is an address-modified address as described in the section of the related art. Address 106 may be unchanged from an input address of the data packet, and may be address-modified using input data in accessing the image memory.

Input data 82 is applied to one input of a selector 60. Input data 82 branches on the way to selector 60, and the branched data is applied to an ALU (Arithmetic Logic Unit) 52 as an input data/instruction code 72. The output of ALU 52 is applied to the other input of selector 60 as an operation result 76. Signals 84 and 88 are applied to two inputs of a selector 62, respectively. Signal 92 indicating the content of the instruction code is applied to a controller 56.

Controller 56 receives signal 92 from pipeline register 66, and controls each portion according to the content, as will be described later, to switch the processing content. In order to do this, controller 56 switches outputs of selectors 60, 62 using a switch signal 112. The output of selector 60 is connected to image memory 54. Address 106 output from pipeline register 66 is also applied to image memory 54. The output of selector 62 is also connected to image memory 54. Controller 56 applies to image memory 54 a G signal 90 informing that image memory 54 is to be accessed.

A latch circuit 58 for temporarily latching the output of image memory 54 is connected to the output of image memory 54. Latch circuit 58 is controlled by a DCK signal 94 from controller 56 so that it latches an output 80 of image memory 54. The output of latch circuit 58 is connected to one input of selector 68. Selector 68 has three inputs in total. Input data 82 (72) from pipeline register 66 branches to be applied to the first input. Data 78 from selector 60 branches to be applied to the second input. Data 108 from latch circuit 58 is applied to the third input, as described above. Selector 68 selects one of the three inputs according to a switch signal 104 from controller 56 for output. Data 108 from latch circuit 58 branches into data 74 applied to the input of ALU 52.

The output of selector 68 is connected to the input of pipeline register 64. Pipeline register 64 serves to generate an output data packet based on data 96 from selector 68 to output the same to the pipeline.

The memory interface apparatus further includes C elements 69, 70 for controlling data latches and outputs of pipeline registers 66, 64, respectively. C element 69 outputs a CP signal 98 for controlling pipeline register 66. C element 70 outputs a CP signal 100 controlling a data latch and output of pipeline register 64 according to communication between an INHB signal 102 from controller 56 and adjacent C element 69 and the like.

The operation of the memory interface apparatus will be described hereinafter according to the content of the instruction code in the data packet. The instruction includes: (1) an instruction other than complex operation (simply read or update); (2) complex operation instruction 1 (operate on read data of an image memory and input data, update the image memory with the operation value, and output the update data); (3) complex operation instruction 2 (operate on read data of an image memory and input data, update the image memory with the operation value, and do not output the update data); (4) complex operation instruction 3 (operate on read data of an image memory and input data, output the operation value, and do not update the image memory); and (5) complex operation instruction 4 (output read data of an image memory, operate on input data and read data, and update the image memory with the operation value). Description will now be given to how the memory interface apparatus operates in response to respective instructions.

(1) Instruction Other than Complex Operation (read or update)

Controller 56 controls selectors 60 and 62 by switch signal 112 as follows. Selector 60 directly applies input data 82 to image memory 54 as data 78. Selector 62 directly applies signal 88 indicating read or update of the image memory to image memory 54 as signal 86. Controller 56 applies to image memory 54 G signal 90 indicating that image memory 54 is to be accessed.

Image memory 54 is accessed by address 106 from pipeline register 66 and G signal 90 from controller 56. Read data or update data 80 from image memory 54 is applied to latch circuit 58. In response to DCK signal 94 from controller 56, latch circuit 58 holds data 80. Simultaneously, controller 56 outputs signal 104 switching selector 68. In response to signal 104, selector 68 applies signal 108 from latch circuit 58 to pipeline register 64 as data 96.

Controller 56 applies an INHB signal 102 allowing output to C element 70. C element 70 provides a CP signal 100 to pipeline register 64 in response to INHB signal 102 attaining a value allowing output. In response to CP signal 100, pipeline register 64 holds data 96 from selector 68, and outputs a data packet.

(2) First Complex Operation Instruction

The first complex operation instruction operates on read data of an image memory and input data, updates the image memory with the operation value, and outputs the update data. Controller 56 controls selectors 60, 62 by switch signal 112 so that input data 82 and signal 88 are output as data 78 and signal 86, respectively. Signal 88, that is, signal 86 indicates reading from image memory 54.

Controller 56 applies to image memory 54 G signal 90 for accessing the image memory. Image memory 54 is read out by address 106 from pipeline register 66 and G signal 90 from controller 56. The read out value is applied to the input of latch circuit 58 as data 80.

Controller 56 applies DCK signal 94 to latch circuit 58. In response to DCK signal 94, latch circuit 58 holds output data 80 of image memory 54. Simultaneously, controller 56 applies to C element 70 INHB signal 102 inhibiting output. C element 70 stops the operation in response to INHB signal 102 attaining a value inhibiting output. Therefore, output from pipeline register 64 is not carried out.

Data held in latch circuit 58 is applied to the input of ALU 52 as data 74. ALU 52 carries out an operation determined by an instruction code from pipeline register 66 between input data from pipeline register 66 and data 74 according to input data/instruction code 72 from pipeline register 66 and data 74. ALU 52 applies operation result 76 to one input of selector 60.

Controller 56 again controls selectors 60 and 62 by switch signal 112. Selector 60 outputs operation result 76. Selector 62 outputs an update signal 84 from pipeline register 66 as signal 86. In addition, controller 56 applies to image memory 54 G signal 90 for accessing the image memory. In response to this, image memory 54 is updated by address 106 from pipeline register 66 and data 78 (operation result 76) from selector 60.

Controller 56 switches and controls selector 68 by signal 104 so that selector 68 outputs output data 78 of selector 60 as data 96. Simultaneously, controller 56 sets INHB signal 102 applied to C element 70 to a value allowing output. In response to INHB signal attaining a value allowing output, C element 70 controls pipeline register 64 so that pipeline register 64 holds data 96 and outputs a data packet.

(3) Second Complex Operation Instruction

The second complex operation instruction operates on read data of an image memory and input data, updates the image memory with the operation value, and does not output the update data. Controller 56 controls selectors 60, 62 by switch signal 112. Selector 60 outputs input data 82. Selector 62 outputs signal 88 indicating reading out. Output data 78 of selector 60 and output signal 86 of selector 62 are applied to image memory 54.

Controller 56 applies to image memory 54 G signal 90 for accessing image memory 54. Image memory 54 is read out by address 106 from pipeline register 66 and G signal 90 from controller 56. The read out value is applied to the input of latch circuit 58 from image memory 54 as data 80.

Controller 56 controls latch circuit 58 by DCK signal 94 so that latch circuit 58 holds output data 80 of image memory 54. Simultaneously, controller 56 sets INHB signal 102 applied to C element 70 to a value inhibiting output. C element 70 stops the output operation.

Data held in latch circuit 58 branches to be applied to ALU 52 as data 74. ALU 52 carries out an operation specified by an instruction code of input data/instruction code 72 between input data of input data/instruction code 72 from pipeline register 66 and data 74. ALU 52 applies operation result 76 to one input of selector 60.

Controller 56 again switches selectors 60, 62 by switch signal 112. Selector 60 outputs operation result 76 from ALU 52 as data 78. Selector 62 outputs update signal 84 from pipeline register 66 as signal 86.

Controller 56 applies to image memory 54 G signal 90 for accessing image memory 54. Image memory 54 is updated by address 106 from pipeline register 66 and data 78 (operation result 76) from selector 60.

Controller 56 sets INHB signal 102 applied to C element 70 to a value inhibiting output. C element 70 stops the output operation in response to INHB signal 102 attaining a value inhibiting output. A data packet is not output from pipeline register 64 to the pipeline.

(4) Third Complex Operation Instruction

The third complex operation instruction operates on read data of an image memory and input data, outputs the operation value to the pipeline, and does not update the image memory. Controller 56 controls selectors 60, 62 by switch signal 112 as follows. Selector 60 outputs input data 82 from pipeline register 66 as data 78. Selector 62 outputs signal 88 from pipeline register 66 as signal 86. Signal 88 attains a value indicating reading out in this case.

Controller 56 applies to image memory 54 G signal 90 for accessing image memory 54. Image memory 54 is read out by address 106 from pipeline register 66 and G signal 90 from controller 56. The read out value is applied to the input of latch circuit 58 from image memory 54 as data 80.

Controller 56 applies DCK signal 94 to latch circuit 58. In response to DCK signal 94, latch circuit 58 holds data 80. Simultaneously, controller 56 sets INHB signal 102 applied to C element 70 to a value inhibiting output. In response to INHB signal 102 attaining a value inhibiting output, C element 70 stops the operation. A data packet is not output from pipeline register 64.

Data held in latch circuit 58 is applied to ALU 52 as data 74. ALU 52 carries out an operation according to an instruction code from pipeline register 66 between input data of input data/instruction code 72 from pipeline register 66 and data 74, and applies operation result 76 to selector 60.

Controller 56 again controls and switches selectors 60, 62 by switch signal 112 so that selector 60 and selector 62 apply operation result 76 and signal 84 from pipeline register 66 to image memory 54, respectively. Output data 78 from selector 60 is operation result 76 from ALU 52. Output signal 86 from selector 62 is update signal 84 from pipeline register 66. Controller 56 does not apply G signal 90 to image memory 54. Therefore, image memory 54 is not updated in this case.

Controller 56 applies switch signal 104 to selector 68. In response to switch signal 104, selector 68 applies output data 78 from selector 60 to pipeline register 64 as output 96. Simultaneously, controller 56 sets INHB signal 102 to a value allowing output, and applies the same to C element 70. In response to INHB signal 102 attaining a value allowing output, C element 70 controls pipeline register 64 so that pipeline register 64 holds output data 96 from selector 68 and outputs an output packet.

(5) Fourth Complex Operation Instruction

The fourth complex operation instruction outputs read data of an image memory, operates on input data and read data, and updates the image memory with the operation value.

Controller 56 controls and switches selectors 60, 62 by switch signal 112 so that selector 60 and selector 62 output input data 82 and signal 88 from pipeline register 64, respectively. In this case, signal 88 attains a value indicating "reading". Controller 56 also applies to image memory 54 G signal 90 for accessing image memory 54.

Image memory 54 is read out by address 106 from pipeline register 66 and G signal 90 from controller 56. The read data 80 is applied to the input of latch circuit 58.

Controller 56 applies DCK signal 94 to latch circuit 58. In response to DCK signal 94, latch circuit 58 holds output data 80 from image memory 54.

Simultaneously, controller 56 sets INHB signal 102 applied to C element 70 to a value inhibiting output. In response to INHB signal 102 attaining a value inhibiting output, C element 70 stops the output operation.

Data held in latch circuit 58 is applied to ALU 52 as data 74. ALU 52 carries out an operation specified by input data/instruction code 72 from pipeline register 66 between input data of input data/instruction code 72 from pipeline register 66 and data 74, and applies operation result 76 to selector 60.

Controller 56 controls selectors 60, 62 by switch signal 112 so that selector 60 and selector 62 output operation result 76 and signal 84 from pipeline register 66, respectively. Therefore, output 78 of selector 60 is operation result 76, and signal 86 from selector 62 is update signal 84 from pipeline register 66. Controller 56 further applies to image memory 54 G signal 90 for accessing image memory 54.

Image memory 54 is updated by address 106 from pipeline register 66 and data 78 (operation result 76) from selector 60.

Controller 56 applies selector switch signal 104 to selector 68. In response to switch signal 104, selector 68 selects output data 108 from latch circuit 58, and applies the same to pipeline register 64 as data 96.

Simultaneously, controller 56 sets INHB signal 102 to a value allowing output, and applies the signal to C element 70. In response to INHB signal 102 attaining a value allowing output, C element 70 controls pipeline register 64 by CP signal 100 so that pipeline register 64 holds data 96 and outputs an output packet.

As described above, with the memory interface apparatus according to this embodiment shown in FIG. 13, it is possible to carry out the complex operation with respect to data of an image memory such as access, update, operation, output of operation result, output of read data, in response to one input data packet. As a result, the following effects can be expected.

Figure 1:
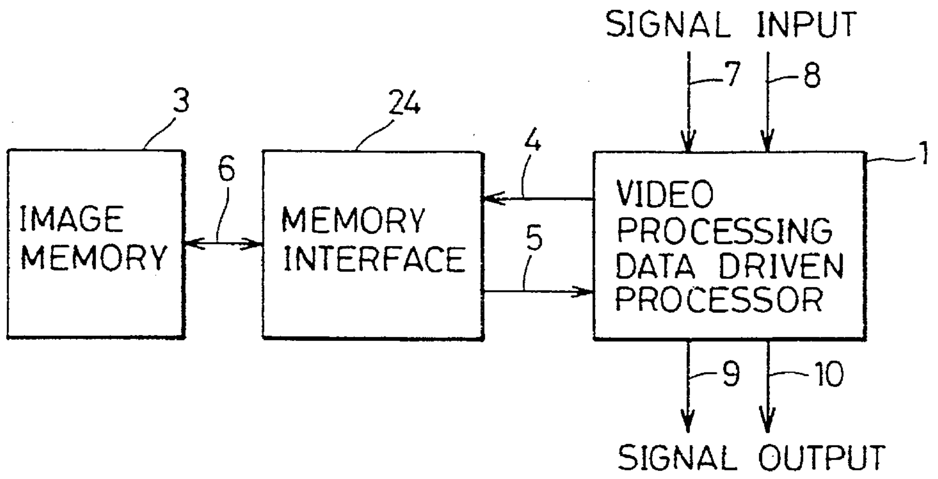
FIG. 1 PRIOR ART
FIG. 1 is a diagram showing a system configuration of a video processing data driven processor using a conventional memory interface apparatus.
Figure 2:
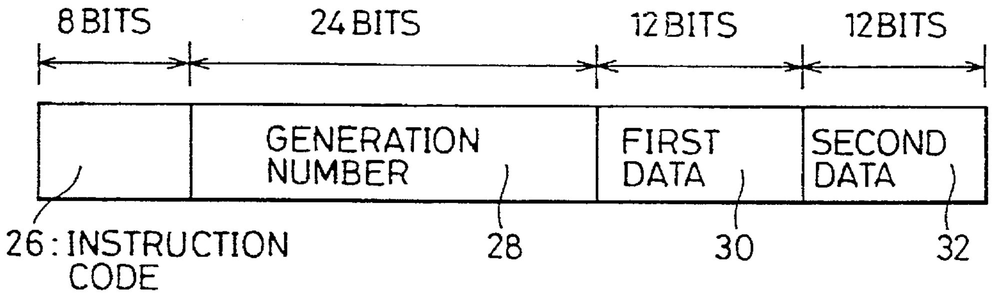
FIG. 2 PRIOR ART
FIG. 2 shows a field configuration of a data packet for a memory interface apparatus.
Figure 3:
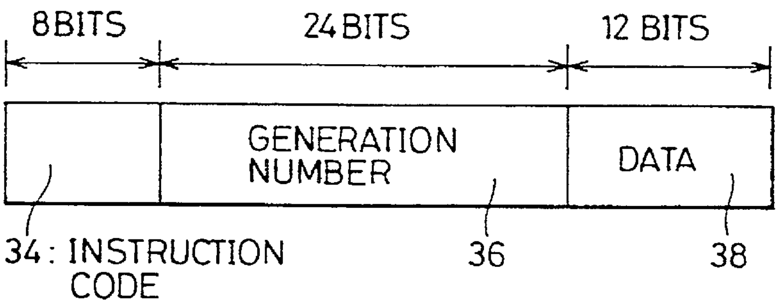
FIG. 3 PRIOR ART
FIG. 3 shows a field configuration of an output data packet for the memory interface apparatus.
Figure 4:
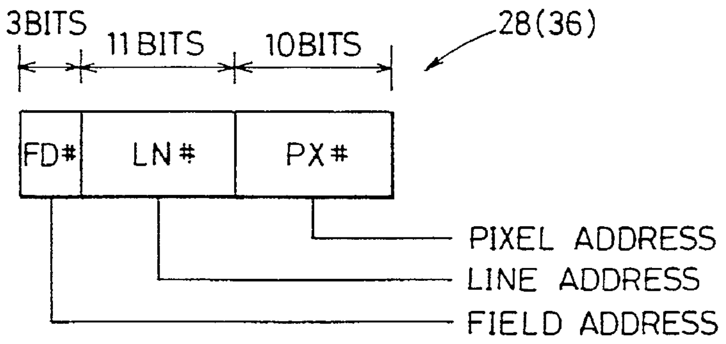
FIG. 4 PRIOR ART
FIG. 4 shows a field configuration of a generation number of a data packet.
Figure 5:
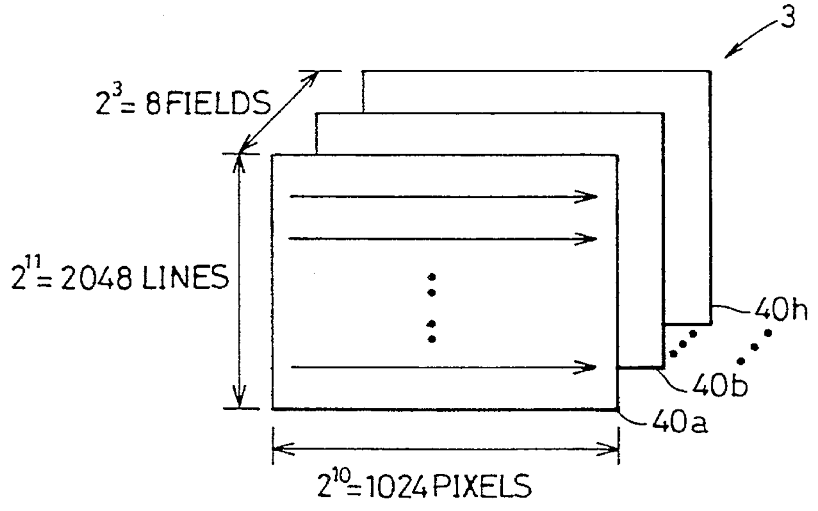
FIG. 5 PRIOR ART
FIG. 5 shows a logical configuration example of an image memory based on a partitioning example of the generation number shown in FIG. 4.
Figure 6:
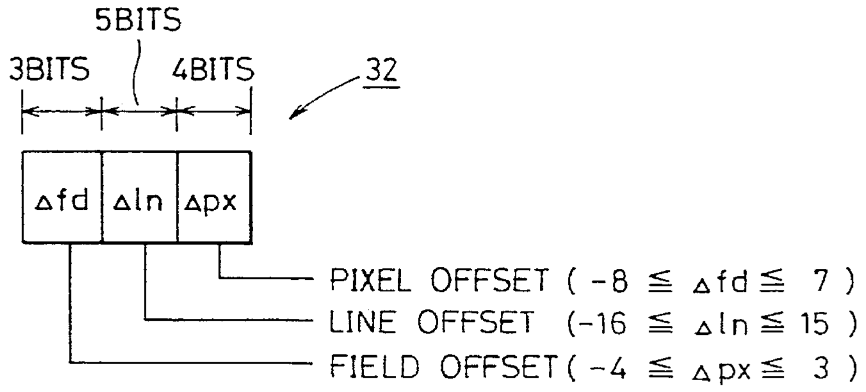
FIG. 6 RELATED ART
FIG. 6 shows a field configuration of an address modifier stored in a second data region in the data packet for the memory interface apparatus.
Figure 7:
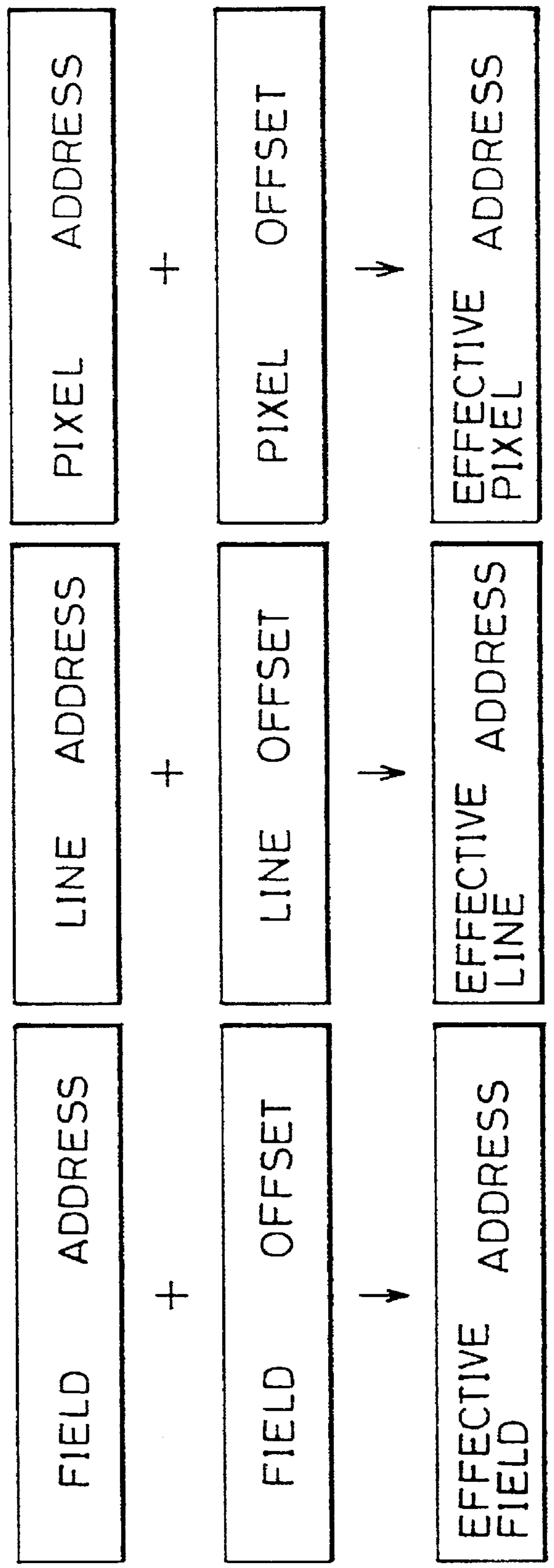
FIG. 7 RELATED ART
FIG. 7 shows a method of determining an effective address using an offset modifier.
Figure 8:
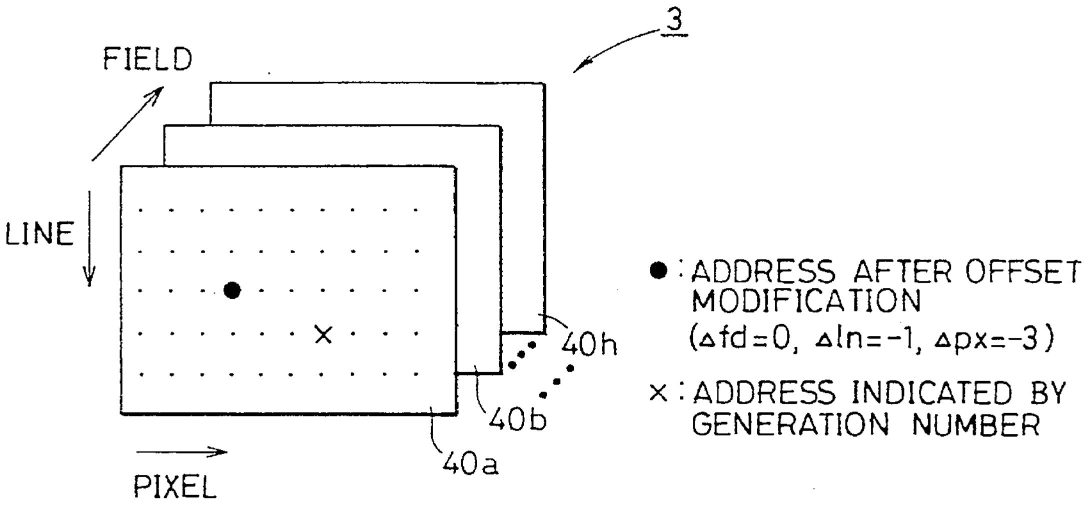
FIG. 8 RELATED ART
FIG. 8 shows a method of address modification in accessing an image memory.
Figure 9:
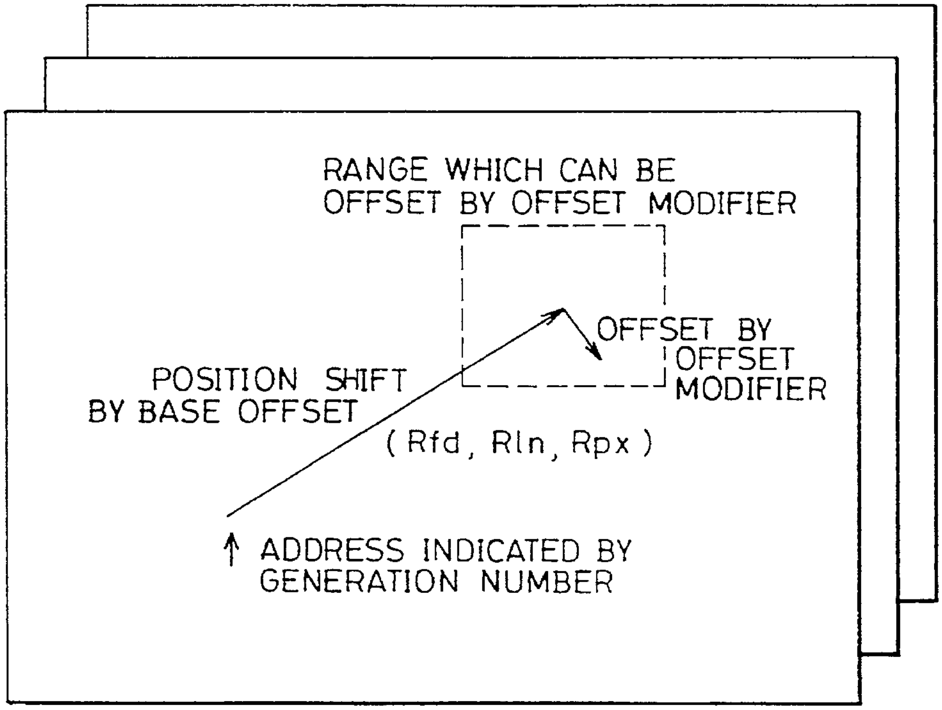
FIG. 9 RELATED ART
FIG. 9 shows a method of a wide area address modification of the memory interface apparatus.
Figure 10:
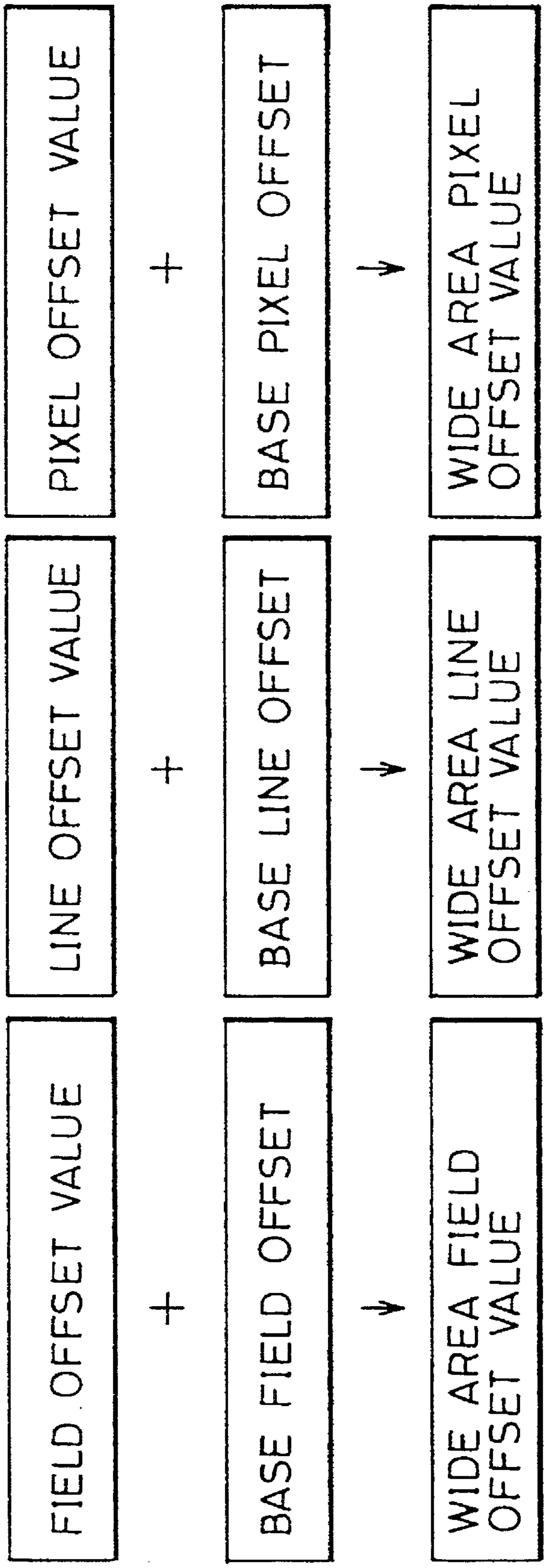
FIG. 10 RELATED ART
FIG. 10 shows a method for determining a wide area offset using a base offset value.
Figure 11:
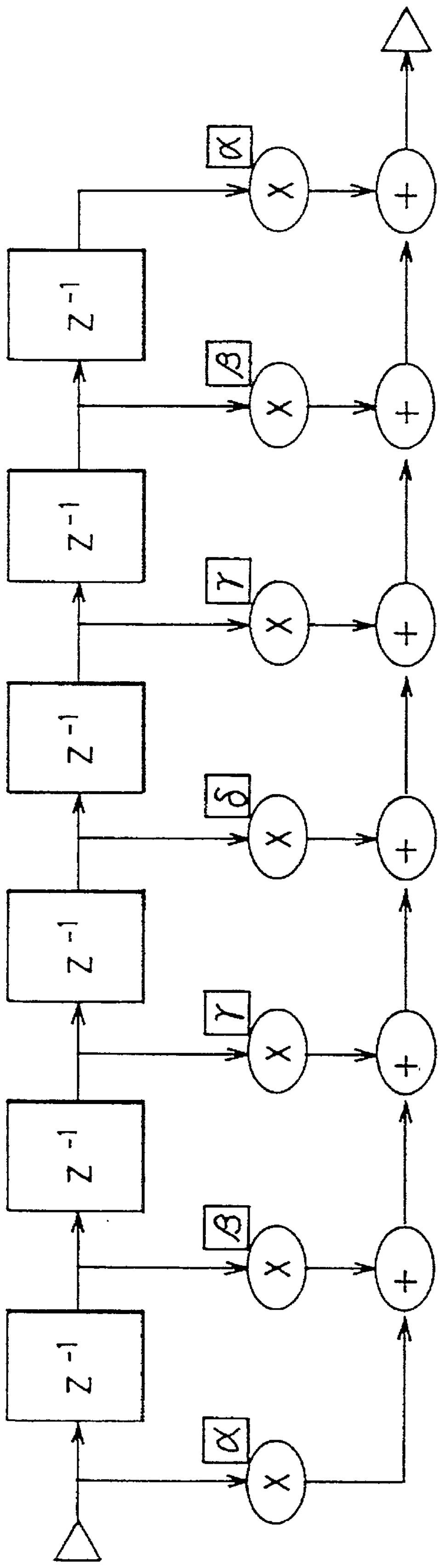
FIG. 11 PRIOR ART
FIG. 11 is a signal flow graph of an FIR filter shown in FIGS. 12 and 14.
Figure 14:
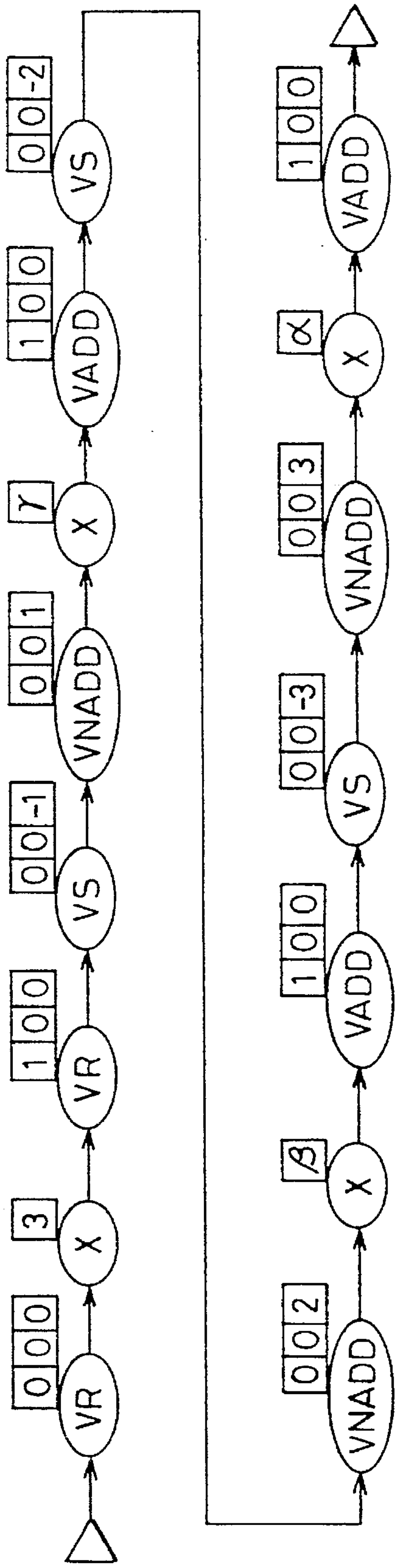
FIG. 14 shows a data flow graph of the FIR filter reduced in the number of processings, which can be implemented by using the complex operation processing according to one embodiment of the present invention.

FIG. 14 is a data flow graph of an FIR filter reduced in the processing amount by the complex operation processing using the memory interface apparatus shown in FIG. 13. A signal flow graph of the FIR filter is shown in FIG. 11.

In FIG. 14, the operation "VNADD" is a complex operation instruction to add input data and the content of an image memory specified by a generation number of a data packet and an offset value, and to output the image memory from the memory interface apparatus without updating the same. This operation corresponds to the above-described third complex operation instruction. The operation "VADD" is a complex operation instruction to carry out operation similar to that of the operation "VNADD", and to update the content of an image memory with the operation value. The operation "VADD" corresponds to the above-described first complex operation instruction. The operation instruction "VR" is an instruction to update input data and an image memory. The operation instruction "VR" corresponds to one of the above-described "instructions other than complex operation". The operation instruction "VS" is an instruction to read out an image memory. This instruction also corresponds to one of the above-described "instructions other than complex operation".

In FIG. 14, a set of three numbers at a right shoulder of each instruction denotes an offset value for specifying a memory access position. An instruction whose offset value is "−1, 2, −3", for example, accesses a position one field before, two lines below and three pixels left of a position of an address indicated by the generation number of the data packet.

In the processing according to the data flow graph shown in FIG. 14, input data is temporarily stored at an address indicated by the generation number, and an address one field after is used for storage of data during operation of the FIR filter processing. However, this is merely one example, and any address may be used for working space during the operation.

Figure 12:
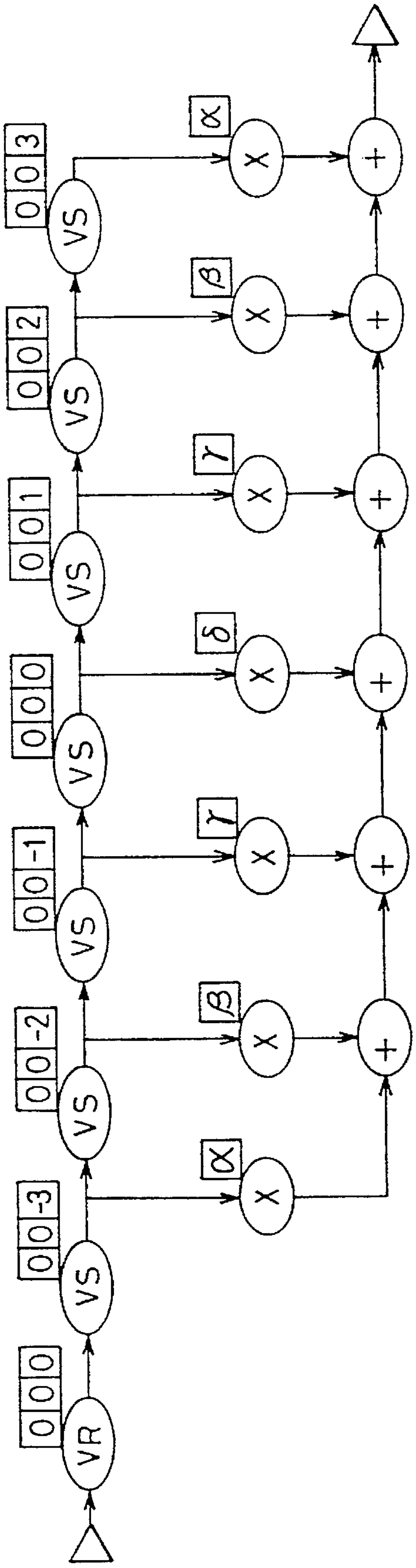
FIG. 12 RELATED ART
FIG. 12 is a data flow graph of the FIR filter using the conventional memory interface apparatus.

In the data flow graph shown in FIG. 14, nodes and arcs are both reduced in number as compared to the data flow graph shown in FIG. 12 using the conventional apparatus. As a result, the amount of processing for implementing the FIR filter is reduced. As the amount of processing is reduced, the number of packets decreases accordingly having the same generation number which stay in the data driven processor. Since a plurality of generations of packets can stay in the data driven processor, parallelism in processing can be improved. The input rate of data packets can be increased, and efficiency of the FIR filter processing by the data driven processor can be increased.

As described above, according to the present invention, by controller 56 controlling pipeline register 66, latch circuit 58, and ALU 52, a series of complex operation processing including an access to image memory 54 can be carried out. In response to one input data packet, a complex operation processing can be implemented including not only update or read of image memory 54, but also the operation processing between data. Therefore, according to the present invention, the number of input/output data packets for implementing the complex processing can be reduced. Furthermore, with the memory interface apparatus of the present invention, the FIR filter processing can be implemented with a smaller number of data packets.

As a result, a memory interface apparatus can be provided which can carry out a complex processing with efficiency.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory interface apparatus provided in a transmission path of a data packet including an instruction code, a generation number, and data, and responsive to an input of the data packet for accessing a predetermined memory, comprising:

first holding means for holding the data packet from said transmission path to provide the instruction code, the generation number modified by the data, and the data separately;

memory access means for accessing said predetermined memory according to said instruction code;

means for receiving an output of said predetermined memory;

operating means having two inputs connected so as to receive data from said first holding means and an output of said receiving means, respectively, for carrying out an operation specified by the instruction code from said first holding means with respect to a value at said two inputs for output of a result;

input selecting means responsive to a select signal for selecting one of data from said first holding means and an output of said operating means to apply a selected result to said predetermined memory as data;

output means for producing a data packet including a result of a series of complex operations carried out by said first holding means, said predetermined memory, and said operating means for output;

transmission control means for controlling transmission of a data packet on said transmission path carried out by said first holding means and said output means; and control means responsive to the instruction code from said first holding means for controlling said operating means, said memory access means, said predetermined memory, said receiving means, said input selecting means, said output means, and said transmission control means so that a series of complex operation processing is carried out including an access to said predetermined memory specified by said instruction code.

2. The memory interface apparatus as recited in claim 1, wherein said output generating means includes output selecting means having a plurality of inputs connected to an output of said input selecting means and an output of said receiving means, respectively, and responsive to an output select signal from said control means for selecting data in one of said plurality of inputs for output, and second holding means having an input connected to an output of said output selecting means for temporarily holding a value at the input for generation of a data packet, and responsive to a transmission control signal output from said transmission path means to output the data packet onto said transmission path.

3. The memory interface apparatus as recited in claim 2, wherein said transmission control means includes first and second transmission control circuits, said first transmission control circuit controlling, by communication of a signal for controlling transmission of a packet between a previous stage of said transmission path and said second holding means, a timing at which said first holding means receives and holds a data packet from the previous stage of said transmission path, and said second transmission control circuit applying, by communication of a signal for controlling transmission of a packet between a succeeding stage of said transmission path and said first holding means, said transmission control signal to said second holding means, but inhibiting output of said transmission control signal in response to an inhibit signal from said control means.

4. The memory interface apparatus as recited in claim 1, wherein said output generating means includes output selecting means having a plurality of inputs respectively connected to an output of said input selecting means, an output of said receiving means, and an output of data of said first holding means, and responsive to an output select signal from said control means for selecting data in one of said plurality of inputs for output, and second holding means having an input connected to the output of said output selecting means, and responsive to a transmission control signal from said transmission control means for temporarily holding a value at the input and generating a data packet to output the data packet onto said transmission path.

5. The memory interface apparatus as recited in claim 4, wherein said transmission control means includes first and second transmission control circuits said first transmission control circuit controlling, by communication of a signal for controlling transmission of a packet between a previous stage of said transmission path and said second holding means, a timing at which said first holding means receives and holds a data packet from the previous stage of said transmission path, and said second transmission control circuit applying, by communication of a signal for controlling transmission of a packet between a succeeding stage of said transmission path and said first holding means, said transmission control signal to said second holding means, but inhibiting output of said transmission control signal in response to an inhibit signal from said control means.

6. The memory interface apparatus as recited in claim 1, wherein said predetermined memory updates and outputs data at a specified address in response to a first access mode signal, and only outputs data at a specified address in response to a second access mode signal, said control means, in response to a predetermined first instruction code from the first holding means, controls said memory access means so that said second access mode signal is applied to said predetermined memory and data of said predetermined memory is read out to said receiving means, controls said output means so that output is inhibited to a succeeding stage of a data packet based on data from said receiving means, and applies the output of said operating means to said predetermined memory and controls said memory access means so that said predetermined memory is updated with the output of said operating means.

7. The memory interface apparatus as recited in claim 6, wherein said control means further controls, after said predetermined memory is updated, said memory access means so that said first access mode signal is applied to said predetermined memory, and data of said predetermined memory is read out to said receiving means, and controls said output means so that a data packet based on data from said receiving means is output to a succeeding stage.

8. The memory interface apparatus as recited in claim 4, wherein said predetermined memory updates and outputs data at a specified address in response to a first access mode signal, and only outputs data at a specified address in response to a second access mode signal, said control means, in response to a predetermined first instruction code applied from said first holding means, controls said memory access means so that said second access mode signal is applied to said predetermined memory and data of said predetermined memory is read out to said receiving means, said operating means carrying out a predetermined operation between the output of said receiving means and data from said first holding means for output of an operation result, controls said input selecting means and said output selecting means so that data from said operating means is provided to said second holding means, and controls said transmission control means so that said second holding means holds a data packet based on data from said input selecting means.

9. The memory interface apparatus as recited in claim 4, wherein said predetermined memory updates and outputs data at a specified address in response to a first access mode signal, and only outputs data at a specified address in response to a second access mode signal, said receiving means includes third holding means responsive to a hold signal from said control means for holding an output of said predetermined memory, said control means, in response to a predetermined first instruction code from the first holding means, controls said memory access means so that said second access mode signal is applied to said predetermined memory, controls said third holding means by said hold signal so that said third holding means holds the output of said predetermined memory, said operating means carrying out a predetermined operation between the output of said receiving means and data from said first holding means for output of an operation result, controls said input selecting means so that data from said operating means is applied to said predetermined memory, controls said memory access means so that said first access mode signal is applied to said predetermined memory, to update said predetermined memory at an address of said generation number, controls said output selecting means so that an output of said third holding means is applied to said second holding means, and controls said transmission control means so that a data packet based on data from said third holding means is held by said holding means.

* * * * *